United States Patent [19]

Moser et al.

[11] Patent Number: 5,709,337

[45] Date of Patent: Jan. 20, 1998

[54] MOUNTING ASSEMBLY FOR A PRESSURE TRANSMITTER

[75] Inventors: Thomas M. Moser, Minneapolis; Charles R. Dolezalek, Blaine; Michael B. Jost, Savage; Mark H. Olson, Minneapolis, all of Minn.

[73] Assignee: Rosemount Inc., Eden Prairie, Minn.

[21] Appl. No.: 731,029

[22] Filed: Oct. 8, 1996

Related U.S. Application Data

[62] Division of Ser. No. 430,743, Apr. 28, 1995, abandoned.

[51] Int. Cl.$^6$ ................................................ B23K 31/02
[52] U.S. Cl. ....................... 228/124.6; 73/756; 228/175; 228/189; 29/25.41
[58] Field of Search .............................. 228/245, 246, 228/249, 122.1, 124.1, 124.6, 132, 175, 189, 258; 29/25.41; 73/756

[56] References Cited

U.S. PATENT DOCUMENTS

| | | | |
|---|---|---|---|
| 2,944,199 | 7/1960 | Hudson | 317/246 |
| 3,496,629 | 2/1970 | Martucci et al. | 228/246 X |
| 4,019,388 | 4/1977 | Hall, II et al. | 73/398 AR |
| 4,085,620 | 4/1978 | Tanaka | 73/727 |
| 4,227,418 | 10/1980 | Bonner et al. | 73/706 |
| 4,246,797 | 1/1981 | Myles | 73/744 |
| 4,295,117 | 10/1981 | Lake et al. | 338/4 |
| 4,303,903 | 12/1981 | Matsuoka et al. | 338/4 |
| 4,322,980 | 4/1982 | Suzuki et al. | 73/727 |
| 4,373,397 | 2/1983 | Keller | 73/721 |
| 4,414,851 | 11/1983 | Maglic | 73/706 |
| 4,502,335 | 3/1985 | Wamstad et al. | 73/721 |
| 4,536,820 | 8/1985 | Binder et al. | 361/283 |
| 4,542,435 | 9/1985 | Freud et al. | 361/283 |
| 4,562,742 | 1/1986 | Bell | 73/718 |
| 4,617,607 | 10/1986 | Park et al. | 361/283 |
| 4,658,651 | 4/1987 | Le | 73/708 |
| 4,771,639 | 9/1988 | Saigusa et al. | 73/727 |
| 4,776,218 | 10/1988 | Sawa et al. | 73/727 X |
| 4,809,555 | 3/1989 | Kunz | 73/727 |
| 4,841,101 | 6/1989 | Pollock | 174/152 GM |
| 4,918,992 | 4/1990 | Mathias | 73/727 |
| 4,926,696 | 5/1990 | Haritonidis et al. | 73/705 |
| 4,930,929 | 6/1990 | Maglic | 403/29 |
| 4,970,898 | 11/1990 | Walish et al. | 73/727 |
| 4,982,608 | 1/1991 | Märki et al. | 73/756 |
| 5,038,069 | 8/1991 | Lukasiewicz et al. | 310/338 |
| 5,079,953 | 1/1992 | Martin et al. | 73/718 |
| 5,116,331 | 5/1992 | Chapman | 73/721 |
| 5,126,617 | 6/1992 | Lukasiewicz et al. | 310/338 |
| 5,157,972 | 10/1992 | Broden et al. | 73/718 |
| 5,186,055 | 2/1993 | Kovacich et al. | 73/727 |
| 5,212,989 | 5/1993 | Kodama et al. | 73/706 |
| 5,222,397 | 6/1993 | Kodama | 73/756 |
| 5,242,097 | 9/1993 | Socha | 228/246 X |
| 5,242,715 | 9/1993 | Schoen et al. | 427/386 |
| 5,257,546 | 11/1993 | Tobita et al. | 73/727 |
| 5,257,547 | 11/1993 | Boyer | 73/756 |
| 5,275,054 | 1/1994 | Park | 73/724 |
| 5,315,877 | 5/1994 | Park et al. | 73/724 |
| 5,329,819 | 7/1994 | Park et al. | 73/724 |
| 5,343,757 | 9/1994 | Tate | 73/724 |
| 5,349,865 | 9/1994 | Kavli et al. | 73/724 |
| 5,376,860 | 12/1994 | Sato | 310/346 |
| 5,394,751 | 3/1995 | Ishibashi | 73/756 |

*Primary Examiner*—Elizabeth L. Dougherty
*Assistant Examiner*—Joseph L. Felber
*Attorney, Agent, or Firm*—Westman, Champlin & Kelly, P.A.; S. Koehler

[57] ABSTRACT

The present invention relates to a mounting assembly for a pressure sensor in a pressure transmitter. The mounting assembly includes a header having a cavity opening to a first surface. The cavity is defined by an inner endwall and an inner sidewall. A support is joined to the inner endwall within the cavity on a first support end. A pedestal has a first pedestal end supporting the pressure sensor and a second pedestal joined to the second support end. Aligning means align the second pedestal end to the second support end in order that a volume of the mounting assembly is increased to thereby reduce a quantity of fill fluid needed in the sensor cavity.

10 Claims, 4 Drawing Sheets

MOUNTING ASSEMBLY FOR A PRESSURE TRANSMITTER

This is a divisional of application Ser. No. 08/430,743, filed Apr. 28, 1995 now abandoned.

BACKGROUND OF THE INVENTION

The present invention relates to pressure transmitters. More particularly, the present invention relates to an improved mounting assembly for supporting a pressure sensor in a sensor cavity.

In electronic pressure transmitters, a compliant diaphragm receives line pressure from a source of pressure to be measured and forms one wall of an otherwise sealed sensor cavity. A pressure sensitive sensor is positioned in the sensor cavity. The cavity is filled with fluid, hereinafter "fill fluid", such as silicone oil. The fill fluid transfers the line pressure from the diaphragm to the pressure sensor.

Commonly, the pressure sensor is made from a brittle material such as silicon and a support surface for supporting the pressure sensor is made of a corrosion resistant metal. An existing design challenge with this type of pressure transmitter is the mounting of the silicon sensor to the corrosion resistant metal. The silicon sensor and the corrosion resistant metal of the transmitter have different coefficients of thermal expansion, which can give rise to stress induced measurement errors as a function of temperature if the metal housing does not properly support the pressure sensor. It is also desirable to reduce the amount of fill fluid present in the sensor cavity so that temperature induced expansion or contraction of the fill fluid is not perceived by the pressure sensor as changes in line pressure.

SUMMARY OF THE INVENTION

The present invention relates to a mounting assembly for a pressure sensor in a pressure transmitter. The mounting assembly includes a header having a cavity opening to a first surface. The cavity is defined by an inner endwall and an inner sidewall. A support is joined to the inner endwall within the cavity on a first support end. The pedestal has a first pedestal end supporting the pressure sensor and a second pedestal end joined to the second support end. Aligning means align the second pedestal end to the second support end in order that a volume of the mounting assembly is increased to thereby reduce a quantity of fill fluid needed in the sensor cavity.

As used herein, "aligning means" is defined as an extending portion of either the transition support or the pedestal that fits within a corresponding aperture of the pedestal or the transition support, respectively. The extending portion has a width less than a body from which it extends.

DETAILED DESCRIPTION OF THE PREFERRED EMBODIMENTS

Figure 1:
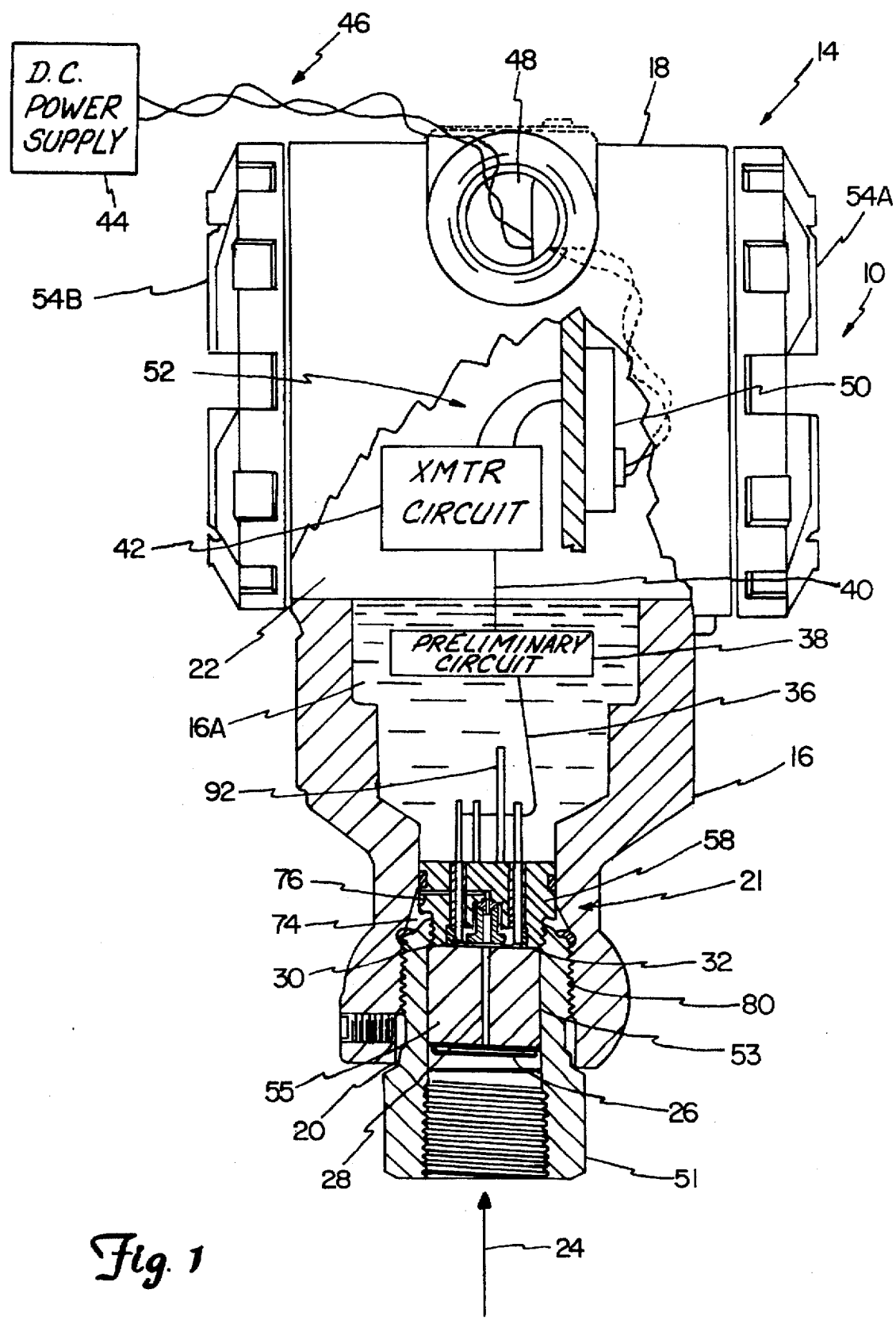
FIG. 1 is a view of a pressure transmitter shown partially in section and partially in block form with a pressure sensor mounting assembly of the present invention.

A transmitter 10 having a pressure sensor mounting assembly 12 (FIG. 2) of the present invention is illustrated in FIG. 1. The transmitter 10 includes a housing 14 having a base 16 joined to an enlarged body 18. The base 16 includes a hole 20 that receives an isolator mounting assembly 21. Without the isolator mounting assembly 21 and other components of the transmitter 10 described below, the hole 20 opens into an interior cavity 22 formed in the interior of the enlarged body 18 through the base 16. The isolator mounting assembly 21 isolates process fluid, herein represented by arrow 24, from entering the interior cavity 22. Generally, a process pipe, not shown, carries the process fluid 24 into contact with a compliant isolator diaphragm 26. The process fluid 24 exerts a pressure on the isolator diaphragm 26. The quantity of substantially incompressible fill fluid such as silicone oil is provided in a passageway 28. The fill fluid in the passageway 28 transmits the process fluid pressure to a pressure sensor 30 provided in a sensor cavity 32, which is also filled with the fill fluid.

Lead wires 36 connect the pressure sensor 30 to a preliminary circuit board 38, which in turn connects by a line 40 to a transmitter circuit 42. As is conventional in the art, an external DC power supply 44 powers transmitter circuit 42 over a twisted wire pair 46, which enters transmitter 10 by a port 48. The twisted wire pair 46 terminates on a terminal block 50 which is connected to transmitter circuit 42 through lines 52. Covers 54A and 54B allow access to the terminal block 50 and the transmitter circuit 42, respectively.

Figure 2:
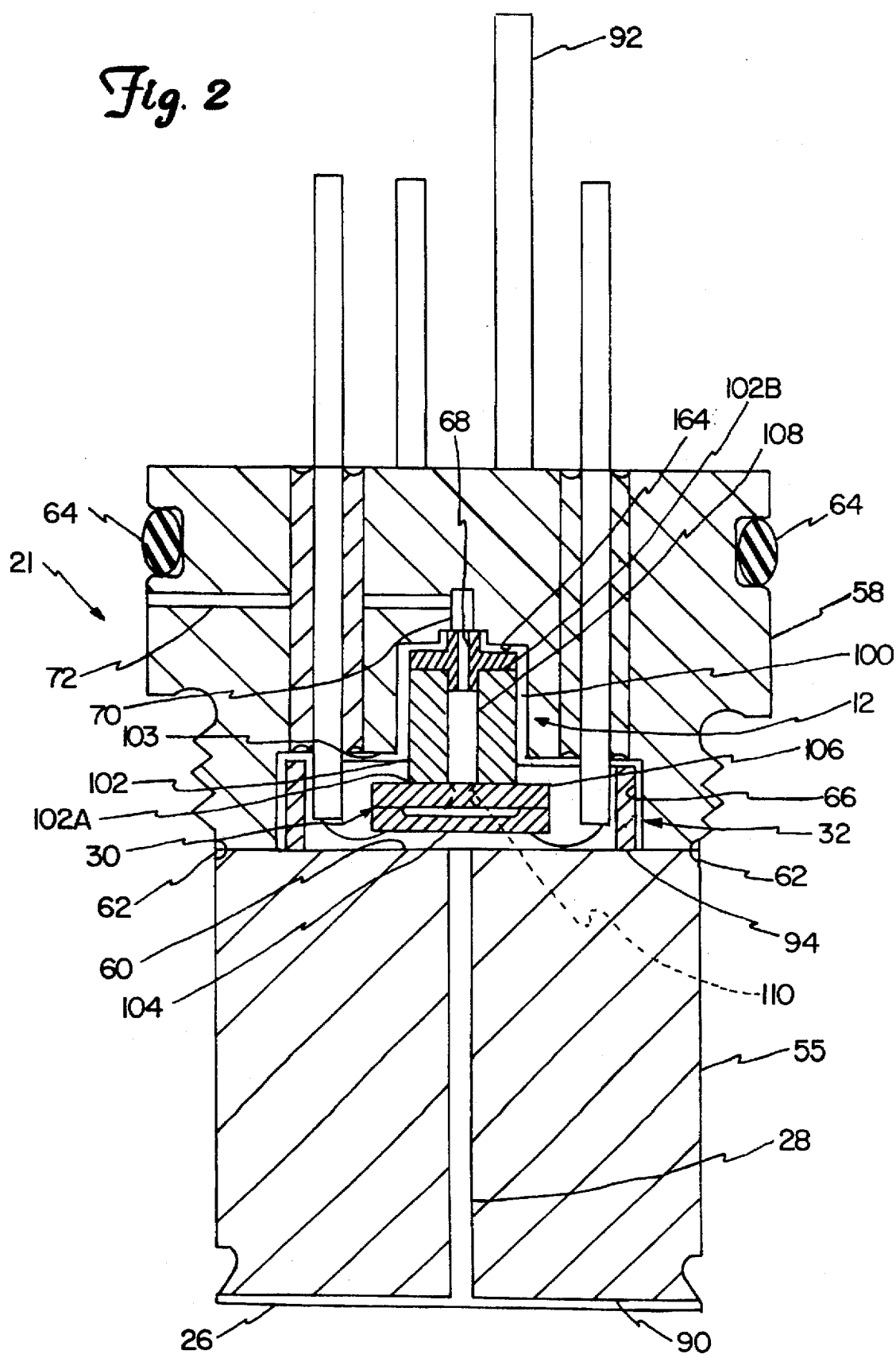
FIG. 2 is a sectional view of an isolator mounting assembly.

In the embodiment illustrated in FIG. 2, the pressure sensor 30 is of the known semiconductor type having a strain gauge, not shown, that responds to the pressure in the sensor cavity 32. For purposes of the invention, other known pressure sensors, fluidically coupled to the isolator diaphragm 26, can be used with the invention, for example, capacitive-based and optically based pressure sensors.

The pressure sensor 30 provides an output signal responsive to the pressure of the fill fluid in the sensor cavity 32, which is representative of the pressure of the process fluid 24. The sensor output signal is provided to the transmitter circuit 42 through the preliminary circuit board 38, which is mounted in the base 16 with a suitable potting material 16A. The transmitter circuit 42 communicates the process fluid pressure by regulating the DC current flowing over the twisted wire pair 46 between four and 20 milliamps (mA). The transmitter circuit 42 can also communicate digitally with a suitable control unit over twisted wire pair 46 by known digital protocols, such as the HART Protocol.

The isolator mounting assembly 21 includes a connector 51, which has a diameter that fits within the opening 20 and a header 58. The connector 51 has an internal passageway indicated generally at 53. The passageway 53 is of size to receive an isolator plug 55. Referring also to FIG. 2, the header 58 is joined to an end 60 of the isolator plug 55 with a suitable annular weld indicated at 62. The header 58 is cylindrical and fits into the opening 20 in the base 16. An o-ring seal 64 around the periphery of the header 58 seals the opening 20 with respect to the interior cavity 22. The header 58 is formed with a suitable recess indicated at 66 on an end facing the isolator plug 55, which forms the sensor cavity 32.

A recess 70 is provided behind a surface 68 and is open to a small diameter hole 72, which extends radially outward to an interspace indicated at 74 in FIG. 1 between the outer periphery of the header 58 and an inner wall 76 of the base 16. The interspace 74 is open to threads 80 retaining the connector 51 to the base 16.

The sensor cavity 32, the passageway 28 and a cavity 90, located on the underside of the diaphragm 26 and opening to the passageway 28, are filled with a suitable substantially incompressible fill fluid, such as silicone oil, through a fill tube 92. It is desirable to reduce the amount of fill fluid in order that thermal and gravitational effects on the fill fluid is not perceived by the pressure sensor 30 as changes in pressure of the fluid 24. A cylindrical spacer 94 is positioned within the sensor cavity 32 to reduce the quantity of fill fluid needed.

Figure 3:
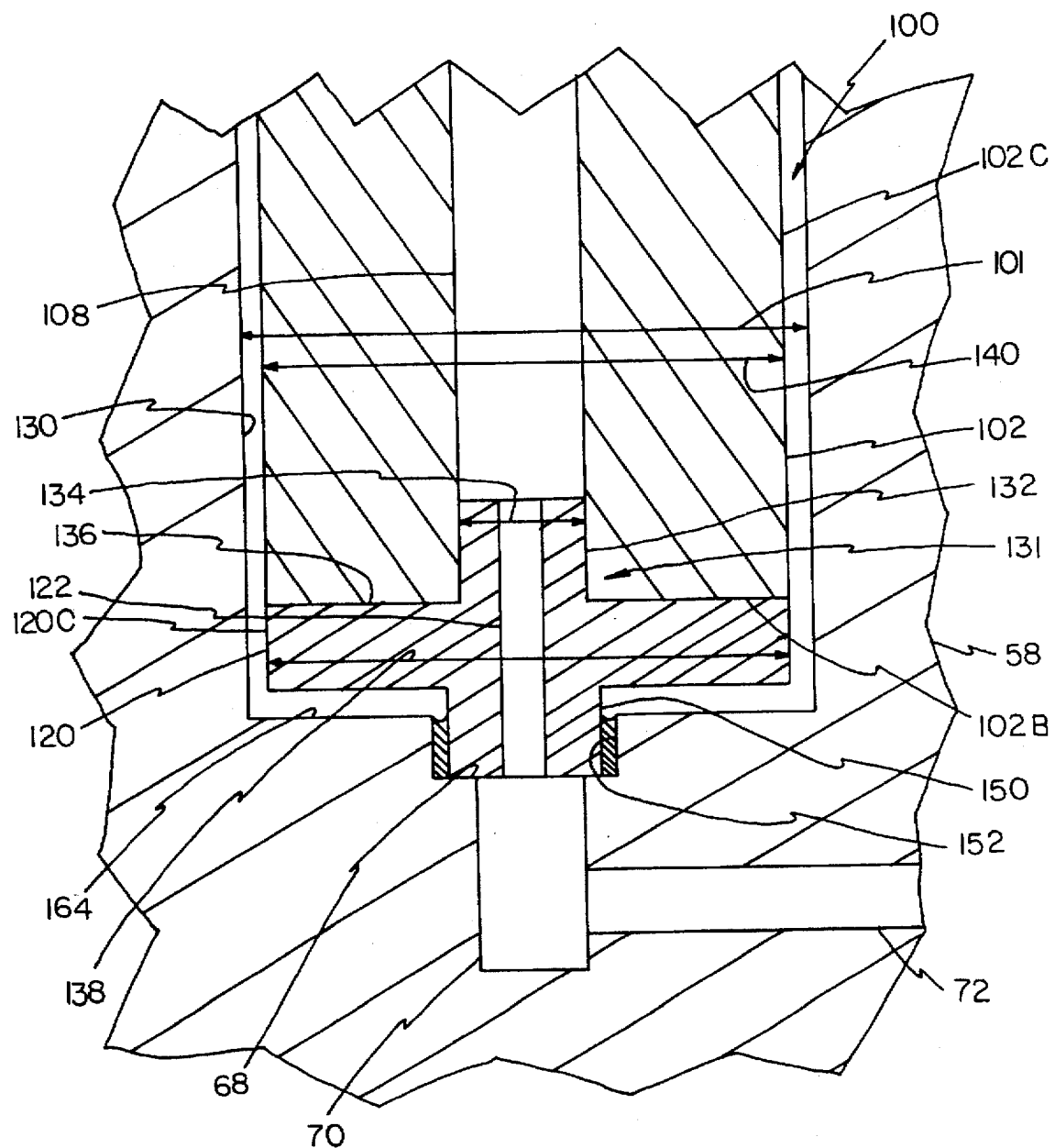
FIG. 3 is an enlarged sectional view of a portion of FIG. 2.

To further reduce the amount of fill fluid, components comprising the mounting assembly 12 are aligned with respect to each other. The mounting assembly 12 supports the pressure sensor 30 within the sensor cavity 32. As illustrated in FIG. 3, the sensor cavity 32 preferably includes a cavity portion 100 opening to a surface 103 and having a reduced diameter indicated by arrow 101. The mounting assembly 12 is substantially located within the cavity portion 100 being supported by the header 58.

The mounting assembly 12 includes a tubular pedestal 102 located in the cavity portion 100. The pedestal 102 is joined to the pressure sensor 30 herein illustrated as a differential pressure sensor. Preferably, the differential pressure sensor 30 comprises a silicon chip 104 having a pressure sensitive diaphragm mounted therein. The silicon chip 104 is joined to a silicon support base 106, which in turn mounts to an end 102A of the pedestal 102. The pedestal 102 preferably has a thermal coefficient of expansion substantially equal to that of the silicon support base 106. In the present embodiment, the pedestal 102 is made of Pyrex® (borosilcate glass). Alternatively, the pedestal 102 can comprise a suitable ceramic such as silicon nitride. An anodic bond joins the end surface 102A of the glass pedestal 102 to a lower surface of the silicon support base 106. The anodic bond provides a hermetic seal about a passageway 108 in the glass pedestal 102, and an orifice 110 in the support base 106 that transmits atmospheric pressure from the passageway 72 in the header 58 to the diaphragm of the of the silicon chip 104. In the embodiment illustrated, atmospheric pressure enters the passageway 72 through the interspace 74 into the recess 70.

At a second end 102B of the glass pedestal 102, the glass pedestal 102 is suitably joined to a transition support 120 (preferably an iron-nickel alloy sold under the trademark Kovar®), which in turn, is joined to the header 58. The transition support 120 has a through opening or bore indicated at 122 that extends from the recess 70 to the passageway 108 in the pedestal. Preferably, the glass to Kovar® seal is a tri-layer of metal on the surface of the glass pedestal 102, which includes a thin first layer of deposited zirconium. Zirconium can be deposited on the glass and bonds permanently to the glass. A layer of nickel is then deposited using known techniques on the zirconium to provide a solder wetable layer. The nickel-zirconium interface is also a permanent bond. An outer coating of gold is provided over the nickel layer to prevent oxidation of the nickel.

The transition support 120 also has a tri-metal layer formed thereon prior to soldering the metal transition support 120 to the glass pedestal 102. The tri-metal layer can be a layer of titanium deposited on the surface of the transition support 120, then a layer of nickel and then a gold layer are applied. Alternatively, a nickel plating followed by a gold plating can be applied to outer surfaces of the header 58 and the transition support 120.

In order to reduce the volume or quantity of substantially incompressible fill fluid in the cavity portion 100 of the sensor cavity 32, it is desirous to form an inner wall 130 of the portion 100 so that it corresponds to outer surfaces 102C and 120C of the glass pedestal 102 and the transition support 120. In the embodiment illustrated, a diameter 101 of the cavity portion 100 is just large enough to insure that the glass pedestal 102 and the transition support 120 do not contact the inner wall 130 with expansion of the glass pedestal 102 and the transition support 102. The mounting assembly 12 includes aligning means 131 illustrated as an aligning boss 132 formed on the transition support 120 with an outer diameter 134 sufficient to accommodate the passageway 108 formed in the glass pedestal 102 and less than an outer diameter 138 from which the aligning boss 132 extends. The aligning boss 132 aligns the glass pedestal 102 on a support surface 136 of the transition support 120 during assembly insuring that the mounting assembly 12 is substantially cylindrical, and will fit in the cylindrical cavity portion 100. Preferably, as illustrated, the outer diameter 138 of the transition support 120 equals an outer diameter 140 of the glass pedestal 102. In this manner, the quantity of fill fluid required is reduced.

It should be understood that although the pedestal 102, the transition support 120, the aligning boss 132, and the passageway 108 have been described as being cylindrical and mounted in a cylindrical cavity portion 100, this is but one configuration of these elements to minimize the remaining volume of the cavity portion 100 after assembly. Other configurations, such as rectangular shaped elements and passageways, can also be used. With respect to the glass pedestal 102 and the transition support 120, both of these elements can have a variety of flat and curved outer surfaces. However, in order to reduce the quantity of fill fluid necessary in the cavity portion 100, it is preferable that the inner wall 130 conforms to the outer surfaces present on the glass pedestal 102 and the transition support 120 so that, for example, if a protrusion was present on the outer surface of the glass pedestal 102 or the transition support 120, a portion of the inner wall 130 would include a conforming recess to maintain the desired clearance between the opposed surfaces.

To reduce the quantity of fill fluid, the mounting assembly 12 occupies at least 70 percent of the volume of the chamber portion 100, but not more than 98 percent to allow for thermal expansion of the pedestal 102 and the transition support 120. Preferably, the mounting assembly 12 occupies at least 80 percent, but not more than 98 percent of the volume of the chamber portion 100.

In addition, it should be understood that in an alternative embodiment, not shown, the aligning means 131 can comprise a pedestal having an aligning boss extending from its end surface that mates with the transition support. The transition support can then have a suitable aperture on its mating surface to receive the aligning boss of the pedestal. As used herein, "aligning means" is defined as an extending portion of either the transition support or the pedestal that fits within a corresponding aperture of the pedestal or the transition support, respectively. The extending portion has a width less than a portion from which it extends.

Figure 4:
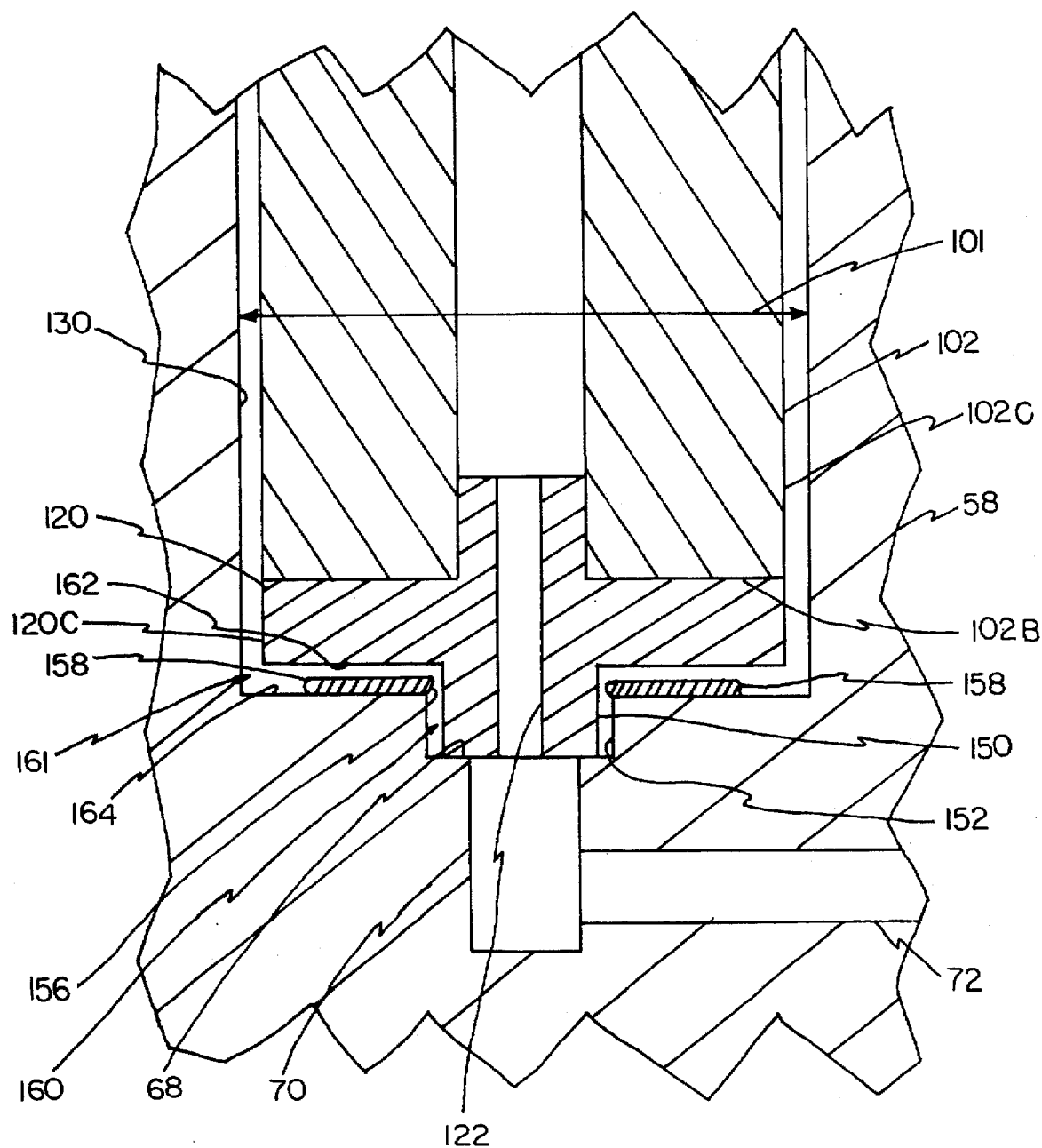
FIG. 4 is a sectional view of the assembly of FIG. 3 at an early stage of construction illustrating a brazing preform.

FIGS. 3 and 4 illustrate a brazing technique for joining the transition support 120 to the header 58. As illustrated, the transition support 120 preferably includes an extending portion 150 that is disposed within a corresponding suitable aperture 152 formed in the recess 70. The recess 70 opens to the aperture 152. Positioning of the extending portion 150 into the aperture 152 provides a method for aligning the transition support 120 to the header 58 and within the cavity portion 100.

Referring to FIG. 4, the extending portion 150 is inserted through an aperture 156 in a brazing preform 158 and is positioned in the aperture 152. During the brazing process, the preform 158 melts and is drawn down by capillary action into a gap 160, preferably cylindrical, located between the extending portion 150 and the aperture 152 in the header 58. As illustrated, a width of the brazing preform 158 is less than a gap 161 formed between a lower surface 162 of the transition support 120 and an end surface 162 of the sensor cavity 32 upon which the preform 158 rests. Preferably, the brazing preform 158 has a portion, herein illustrated as an inner circular edge, that extends over the gap 160 so that upon melting the brazing preform 158 begins to flow into the gap 160. In this manner, the brazing preform 158 flows into the gap 160, and does not substantially remain in the space formed between the surfaces 162 and 164. By joining the transition support 120 to the header 58 only at the extending portion 150, the transition support 120 is allowed to freely expand and contract as temperature changes, thereby reducing the stress on the glass pedestal 102.

Preferably, the brazing preform 158 is formed as a thin washer (approximately 0.002–0.004 inches thick). The brazing preform 158 reduces the distance necessary between the surfaces 162 and 164, thereby reducing the quantity of substantially incompressible fill fluid present in the sensor cavity 32. The brazing preform 158 has an area sufficient to provide a suitable amount of brazing material in the gap 160 as illustrated in FIG. 3. The brazing preform 158 is preferably melted in a suitable furnace, which is evacuated or includes an inert gas. If desired, the brazing material is selected to have a melting temperature similar to a solder material that can be used to join the glass pedestal 102 to the transition support 120. In this manner, the glass pedestal 102 is joined to the transition support 120, and the transition support 120 is joined to the header 58 in one manufacturing step. It should be understood that the glass pedestal 102 and Kovar transition support 120 are but one combination for supporting the pressure sensor in the sensor cavity 32. If desired, other suitable materials for the pedestal 102, such as ceramic, and other suitable alloys for the transition support 120, can be used in the present invention.

Although the present invention has been described with reference to preferred embodiments, workers skilled in the art will recognize that changes may be made in form and detail without departing from the spirit and scope of the invention.

What is claimed is:

1. A method for joining a support of a pressure transmitter used to support a pressure sensor in a sensor cavity to a support surface of a header of the pressure transmitter, the support surface having an aperture, the method comprising:

providing a support having an extending portion and an annular surface disposed about the extending portion;

positioning the support in the sensor cavity wherein the aperture receives the extending portion and the annular surface faces and is positioned in close proximity to the support surface without making contact with the support surface;

locating a meltable preform between the support surface and the annular surface of the support, the preform having a width less than a distance of a gap between the support surface and the annular surface; and heating the meltable preform to melt the preform so that the melted preform flows into the aperture and that the melted preform does not bridge the gap to make substantial contact with the support surface and the annular surface.

2. The method of claim 1 wherein the cavity opens to a second recess formed in the header, and wherein the second recess has a width greater than the cavity and the support extends out of the cavity.

3. The method of claim 2 wherein the support includes a first portion and a second portion, wherein the first portion includes the extending portion, and wherein the second portion is joinable to the first portion on an end of the first portion remote from the support surface with a meltable material, and wherein the step of heating includes melting the meltable material while melting the meltable preform.

4. The method of claim 2 wherein the support occupies 70 to 98 percent of the volume of the sensor cavity.

5. The method of claim 4 wherein the support occupies 80 to 98 percent of the volume of the sensor cavity.

6. A method for joining a support of a pressure transmitter used to support a pressure sensor in a sensor cavity to a support surface of a header of the pressure transmitter, the support surface having an aperture, the method comprising:

providing a support having an extending portion and an annular surface disposed about the extending portion;

positioning the support in the sensor cavity wherein the aperture receives the extending portion and the annular surface faces and is positioned in close proximity to the support surface without making contact with the support surface;

locating a meltable preform between the support surface and the annular surface of the support, the preform having a width less than a distance of a gap between the support surface and the annular surface;

heating the meltable preform to melt the preform so that the melted preform flows into the aperture in order that the support is joined to the header at only the extending portion.

7. The method of claim 6 wherein the cavity opens to a second recess formed in the header, and wherein the second recess has a width greater than the cavity and the support extends out of the cavity.

8. The method of claim 7 wherein the support occupies 70 to 98 percent of the volume of the sensor cavity.

9. The method of claim 8 wherein the support occupies 80 to 98 percent of the volume of the sensor cavity.

10. The method of claim 6 wherein the support includes a first portion and a second portion, wherein the first portion includes the extending portion, and wherein the second portion is joinable to the first portion on an end of the first portion remote from the support surface with a meltable material, and wherein the step of heating includes melting the meltable material while melting the meltable preform.

* * * * *